Dec. 3, 1935. G. P. BOSOMWORTH 2,023,002
METHOD OF REMOVING VULCANIZED ARTICLES FROM MOLDS, AND APPARATUS THEREFOR
Filed Sept. 6, 1933 2 Sheets-Sheet 1
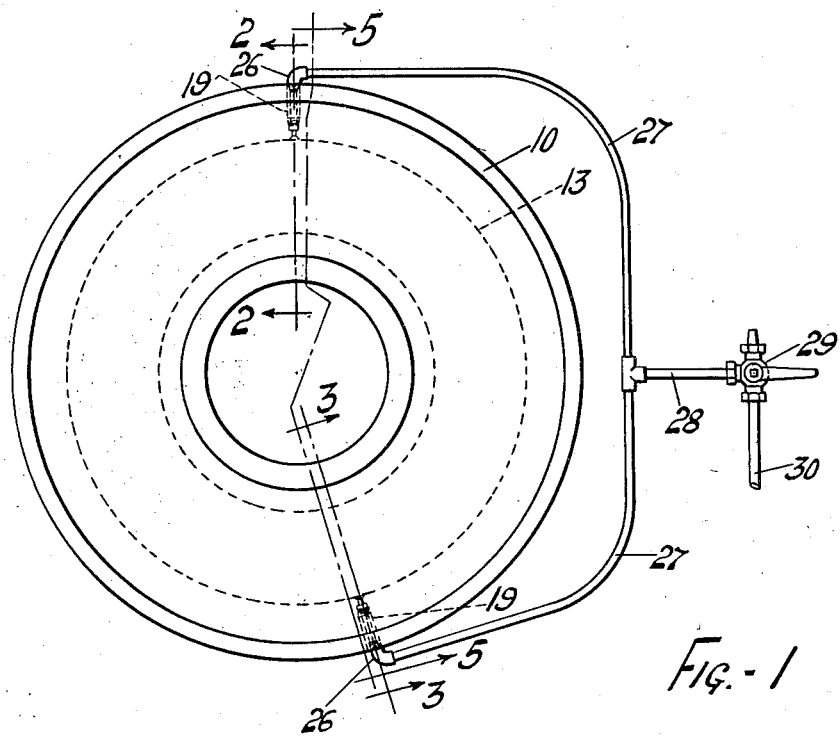
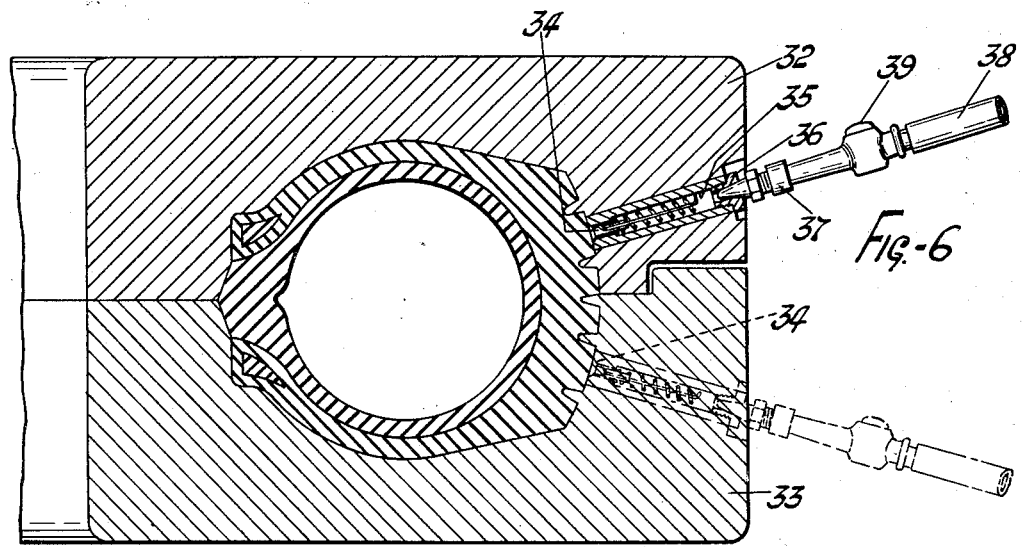
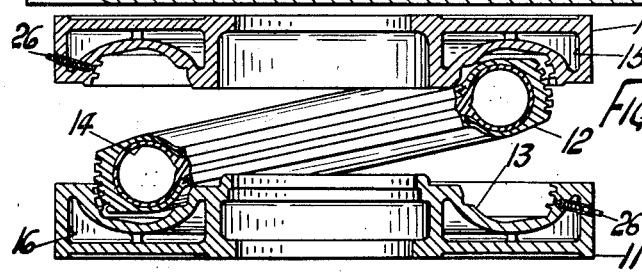
INVENTOR
GEORGE P. BOSOMWORTH
BY Ely Barrow
ATTORNEYS Dec. 3, 1935.  G. P. BOSOMWORTH  2,023,002
METHOD OF REMOVING VULCANIZED ARTICLES FROM MOLDS, AND APPARATUS THEREFOR
Filed Sept. 6, 1933  2 Sheets-Sheet 2

INVENTOR
GEORGE P. BOSOMWORTH
BY Ely & Barrow
ATTORNEYS

Patented Dec. 3, 1935

2,023,002

UNITED STATES PATENT OFFICE 2,023,002

METHOD OF REMOVING VULCANIZED ARTICLES FROM MOLDS, AND APPARATUS THEREFOR

George P. Bosomworth, Akron, Ohio, assignor to The Firestone Tire & Rubber Company, Akron, Ohio, a corporation of Ohio Application September 6, 1933, Serial No. 688,320

5 Claims. (Cl. 18—2)

This invention relates to methods and apparatus for removing vulcanized articles from molds, and more especially it relates to improved procedure and apparatus for extracting articles of vulcanized rubber composition from the molds in which they are vulcanized. The invention is of especial utility in the removing of vulcanized pneumatic casings from molds wherein the configuration of the tire treads is such that there is a mechanical interlock between the tires and molds in addition to the normal adhesion of the tires to the molds, so that considerable power is required to remove the tires from the molds.

Heretofore it has been common practice to extract tires from vulcanizing molds either manually or by mechanical means. By either method the use of bead clamping rings was almost essential, especially where the tires were vulcanized in individual, watchcase vulcanizers.

The chief objects of this invention are to provide an improved method and improved apparatus for extracting tires from vulcanizing molds; to obviate the use of mechanical devices for extracting tires; and to provide apparatus that does not require the use of bead clamping rings on the tires. Other objects will be manifest.

The invention is equally applicable to vulcanizing molds that are heated in pot heaters and to steam-jacketed molds such as are used with watchcase vulcanizers. Since the latter vary greatly in construction, and in no way affect the operation of the invention, only the molds thereof need be illustrated herein.

Of the accompanying drawings:

Figure 1 is a plan view of a steam-jacketed mold constituting one embodiment of the invention;

Figure 5 is a section on the line 5—5 of Figure 1, showing the relation of the mold sections and the work as the latter is stripped from the mold sections during the opening of the mold; and Figure 6 is a sectional view of the apparatus as applied to a vulcanizing mold such as is heated in a pot heater.

Figure 2:
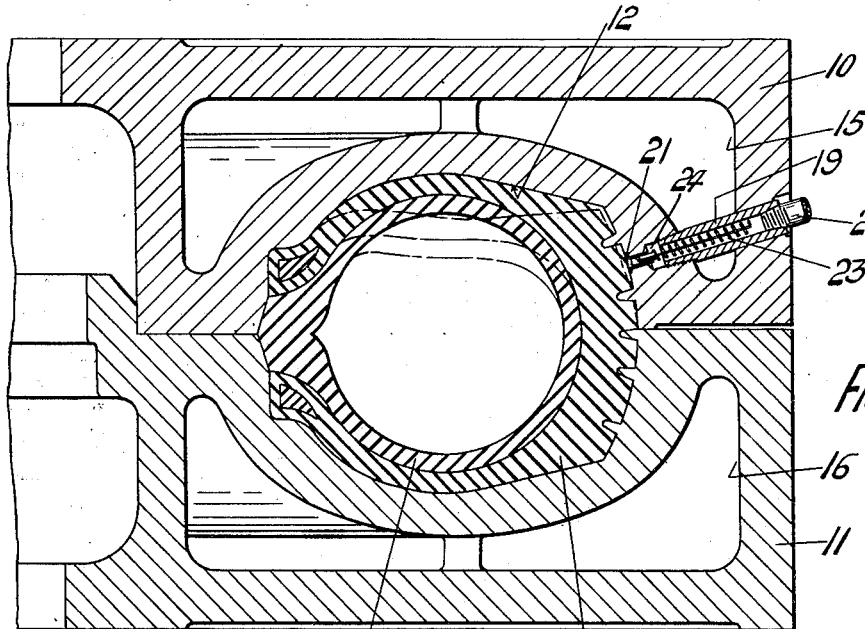
Figure 2 is a section on the line 2—2 of Figure 1, on a larger scale.
Figure 3:
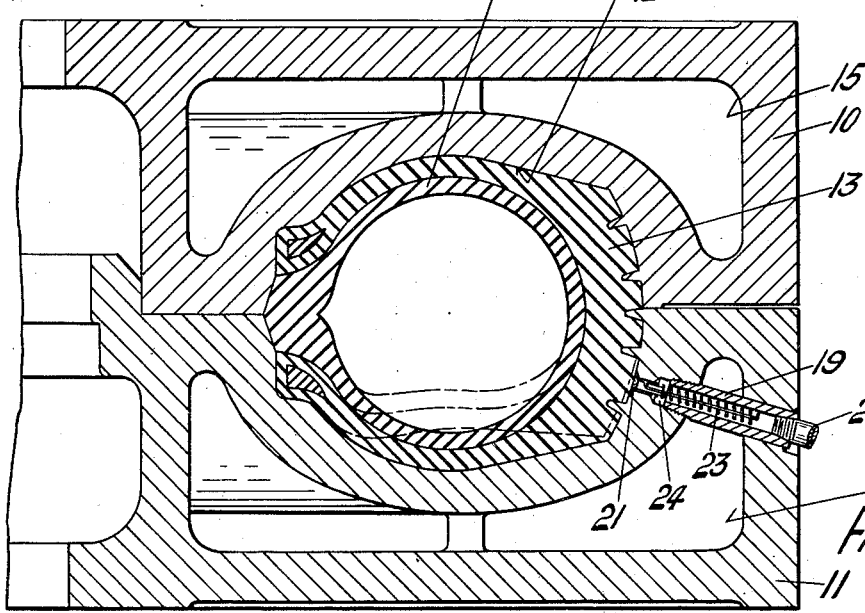
Figure 3 is a section on the line 3—3 of Figure 1, on the same scale as Figure 2.
Figure 4:
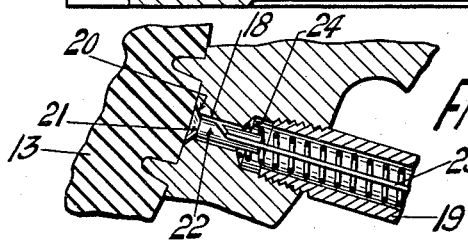
Figure 4 is an enlarged, sectional detail of a valve associated with the apparatus.

Referring to Figures 1 to 5 inclusive of the drawings, 10 and 11 are the upper and the lower sections respectively of a two-part, annular, steam-jacketed mold, said sections defining an annular, internal molding cavity 12 for receiving a pneumatic tire casing 13. The latter usually is vulcanized upon an expansible core 14 that is distended by fluid pressure admitted thereto through a suitable valve stem (not shown). The mold sections 10, 11 are formed with respective steam chambers 15, 16 adjacent the cavity 12, steam being admitted to said chambers through the usual steam connections, (not shown) for vulcanizing the work 13 is said cavity, said work being forced against the wall of said cavity by the distending of the expansible core 14.

Each mold section 10, 11 comprises means for conducting pressure fluid to its half of the molding cavity 12, and to this end each mold section is radially bored at 18, and a short section of pipe 19 is threaded into said bore from the outer peripheral face of the mold section, said pipe being adapted to conduct fluid through the steam chambers 15, 16 of the mold sections. That end of the bore 18 that terminates in the cavity 12 is countersunk at 20 so as to constitute a valve seat for frusto-conical valve 21, the latter being provided with an axial stem 22 that is disposed within bore 18, and is connected to a compression spring 23 that seats in a counterbore 24 at the opposite end of bore 18 from countersink 20, the arrangement being such as normally to urge valve 21 into its seat 20. The valve 21 is flush with the surface of molding cavity 12 so as to leave not a mark on the work vulcanized therein, and it effectively prevents any of the rubber of the work from being forced into bore 18 during a vulcanizing operation.

Preferably the valve 21 in the upper mold section 10 is disposed approximately diametrically opposite the similar valve in the lower mold section 11, as is most clearly shown in Figures 1 and 5. Threaded into the outer end of each pipe 19 is an elbow 26, and respective flexible pipes 27 connect said elbows to a header pipe 28 communicating with a three-way, manually operated valve 29, the latter having communication with a source of pressure fluid (not shown), such as compressed air, through a pipe 30. The arrangement is such that air under pressure may be admitted to molding cavity 12 concurrently on opposite sides of the parting plane thereof, and at substantially diametrically opposite points thereof.

In the operation of the apparatus described, the tire 13 is mounted in the mold cavity 12, the mold is closed thereon, and the tire is vulcanized in the usual manner by heat from steam in the chambers 15, 16 while it is subjected to internal pressure from the distended expansible core 14. After vulcanization of the tire is complete, pressure in the core 14 is relieved and the mold is opened by raising the upper mold section 10 from the lower mold section 11, as shown in Figure 5. Concurrently with the lifting of mold section 10, the valve 29 is operated to admit compressed air to the mold cavity 12. The tire therein is tightly sealed in the mold at its bead portions and at the ribs of the tread so that the air entering through valves 21 passes first between the cavity wall and side walls of the tire to effect separation of the tire and mold at these points, as shown in broken lines in Figures 2 and 3. As the mold sections continue their movement of separation, the bead and tread portions of the tire separate from the respective mold sections at points adjacent the valves 21, as shown in Figure 5, and because these points are at opposite sides of the mold, the tire assumes an angular position with relation to the mold, as shown in Figure 5, with the result that the adhesion of the bead and tread portion of the tire to the mold is progressively broken both ways from the points of initial separation. The finished tire may then be removed from the mold, which completes a cycle of operation.

Although the foregoing method of operation is preferred, the procedure may be varied without departing from the invention or sacrificing all the advantages thereof. Thus, for example, the mold section 10 may be raised to effect mechanical stripping of the tire from the upper mold section, and thereafter air may be admitted to the lower mold section to separate the tire therefrom. Another method would be to admit air to the upper section before the latter is lifted, and then admit air to the lower section only while raising the upper section.

The invention is simple in construction and operation, it saves labor, and achieves the other objects set out in the foregoing statement of objects.

The embodiment of the invention shown in Figure 6 comprises upper and lower mold sections 32, 33 that do not include steam chambers, heat being applied to the mold by placing it in a pot heater. The mold is provided with valves 34 in its respective sections similar to valves 21 of the previously described embodiment, it being understood that the valve (shown in broken lines) in the lower mold section 33 is disposed substantially 180° from the valve in the upper section. An air passage 35 in each mold section extends from each valve 34 to the outer periphery of the mold, and a ground, frusto-conical socket 36 is mounted in the outer end of each passage 35. The sockets 36 are adapted to receive the complementally shaped end portion of a nozzle 37 mounted upon a flexible hose 38 that communicates with a source of fluid pressure (not shown). The nozzle 37 includes a valve that is manually operated by a push button 39 on the nozzle.

In the operation of this embodiment of the invention, the tire is mounted in the mold and vulcanized therein while the mold is in a pot heater. After the mold is removed from the heater it is opened by lifting the upper mold section 32, and the work is loosened by inserting the nozzle 37 into the socket 36 and admitting fluid pressure, past the valve 34, as in the previously described embodiment of the invention. Preferably the pressure is admitted to the upper mold section as it is being lifted, and then to the lower mold section after the upper mold section is raised, but the procedure may be reversed if desired.

Modification may be resorted to without departing from the spirit of the invention or the scope of the appended claims, which are not limited wholly to the specific construction shown or exact procedure described.

What is claimed is:

1. The method of removing vulcanized articles from molds including a pair of annular molding sections, which comprises admitting fluid pressure between the article and the molding surfaces of respective molding sections, concurrently with the opening of the mold, the fluid pressure being admitted in one molding section substantially diametrically opposite to the point of admitting fluid pressure to the other molding section.

2. The method of removing vulcanized articles from molds including a pair of annular molding sections, which comprises admitting fluid pressure between the article and the molding surfaces of the respective molding sections concurrently with the opening of the mold, said pressure being applied at points removed from the parting plane of the mold and at substantially diametrically opposite positions on the two molding sections.

3. In apparatus of the character described, the combination of a mold comprising mating sections defining an internal molding cavity, and means for admitting fluid pressure to the molding cavity on opposite sides of the parting plane of the mold, and at opposite points in respective mating sections.

4. In apparatus of the character described, the combination of annular mating mold sections defining an annular molding cavity, each of said sections being formed with a passage therethrough extending from the molding cavity to the exterior of the mold, said passages intersecting said cavity at substantially diametrically opposite points, and respective valves in said passages.

5. In apparatus of the character described, the combination of an annular tire mold comprising mating mold sections defining a molding cavity, each mold section having a bead molding portion at the inner periphery of the molding cavity and having a radially inwardly extending rib at the outer periphery of said molding cavity, whereby a tire molded therein has stronger engagement with the cavity adjacent the parting plane of the mold than at other parts of the cavity, and means for introducing fluid under pressure into said molding cavity between the wall thereof and a tire molded in said cavity for removing the tire from the molding cavity, whereby said fluid operates first to separate the tire from the wall of the cavity in the regions thereof remote from the parting plane of the mold, thereby permitting the fluid to be admitted about the annular molding cavity for forcing the tire therefrom before the fluid may escape from the cavity.

GEORGE P. BOSOMWORTH.